Oct. 17, 1933.  L. H. HEUER  1,930,715
SPRING ASSEMBLING MACHINE
Filed Feb. 3, 1933  9 Sheets-Sheet 3
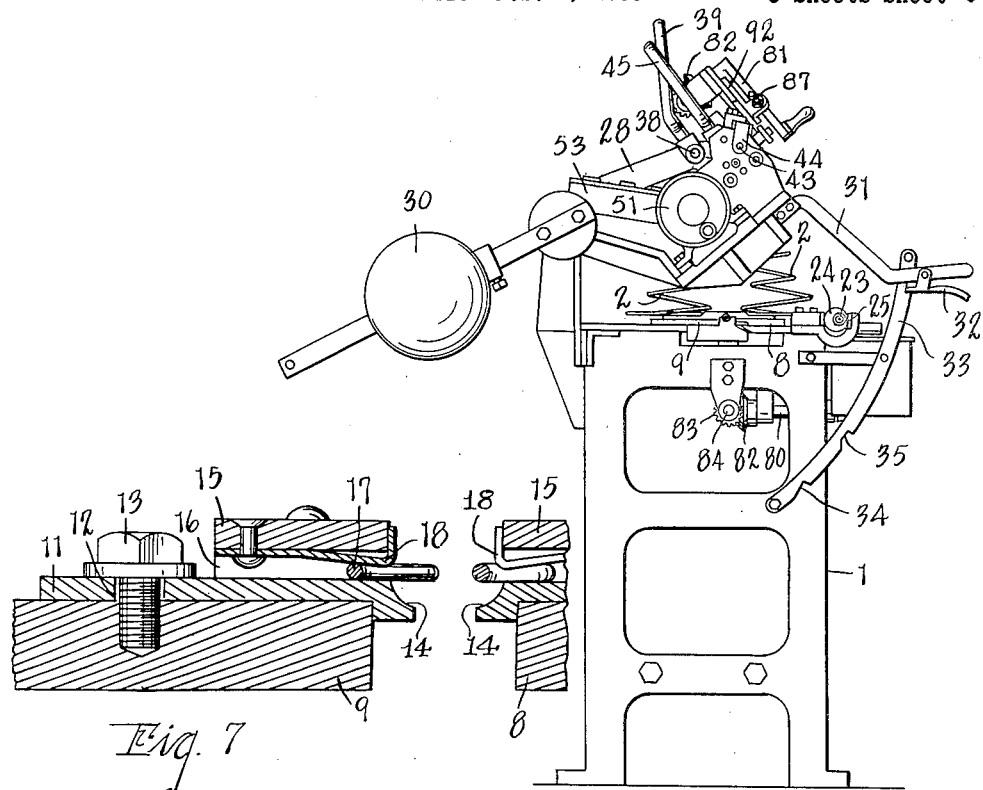
Fig. 7
Fig. 3
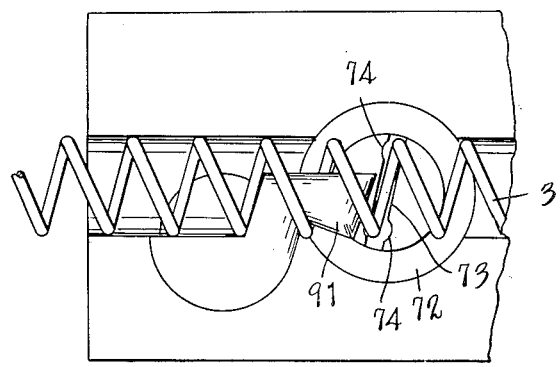
Fig. 8
INVENTOR
Lawrence H. Heuer
BY
Chappell & Earl
ATTORNEYS

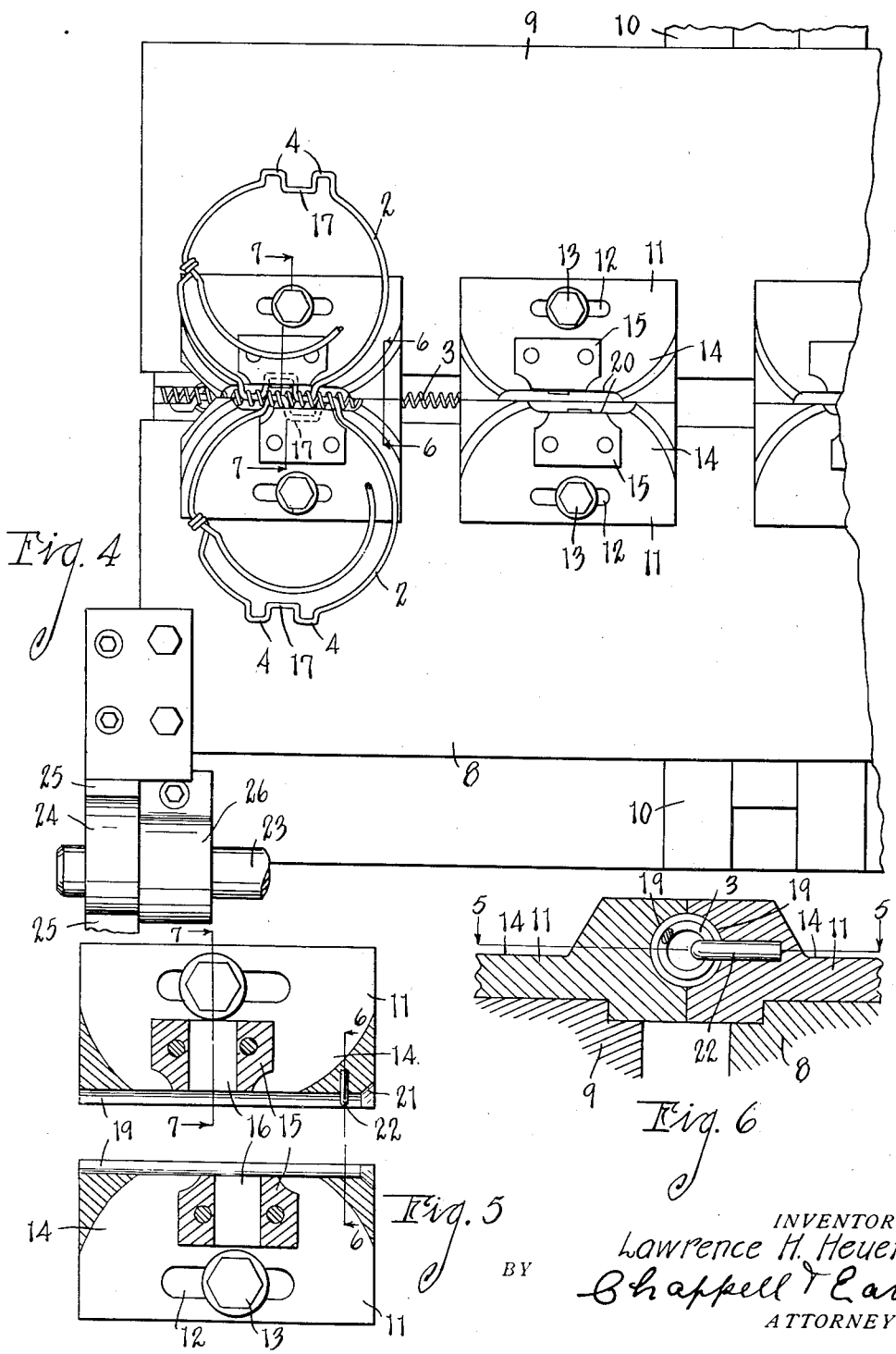

Oct. 17, 1933.    L. H. HEUER    1,930,715
SPRING ASSEMBLING MACHINE
Filed Feb. 3, 1933    9 Sheets-Sheet 5
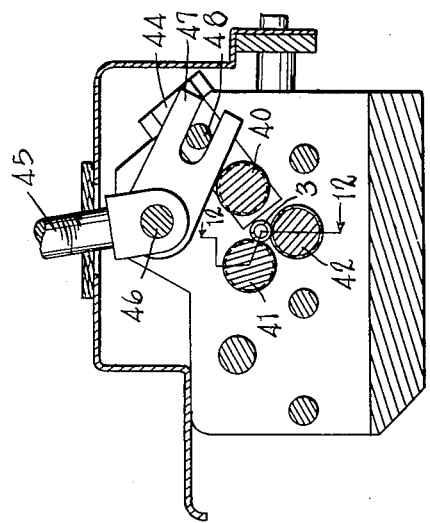
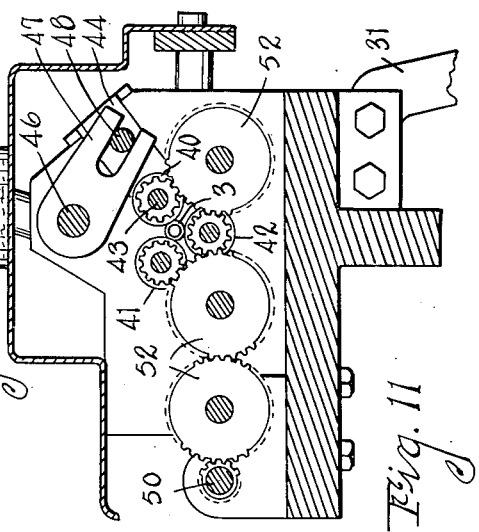
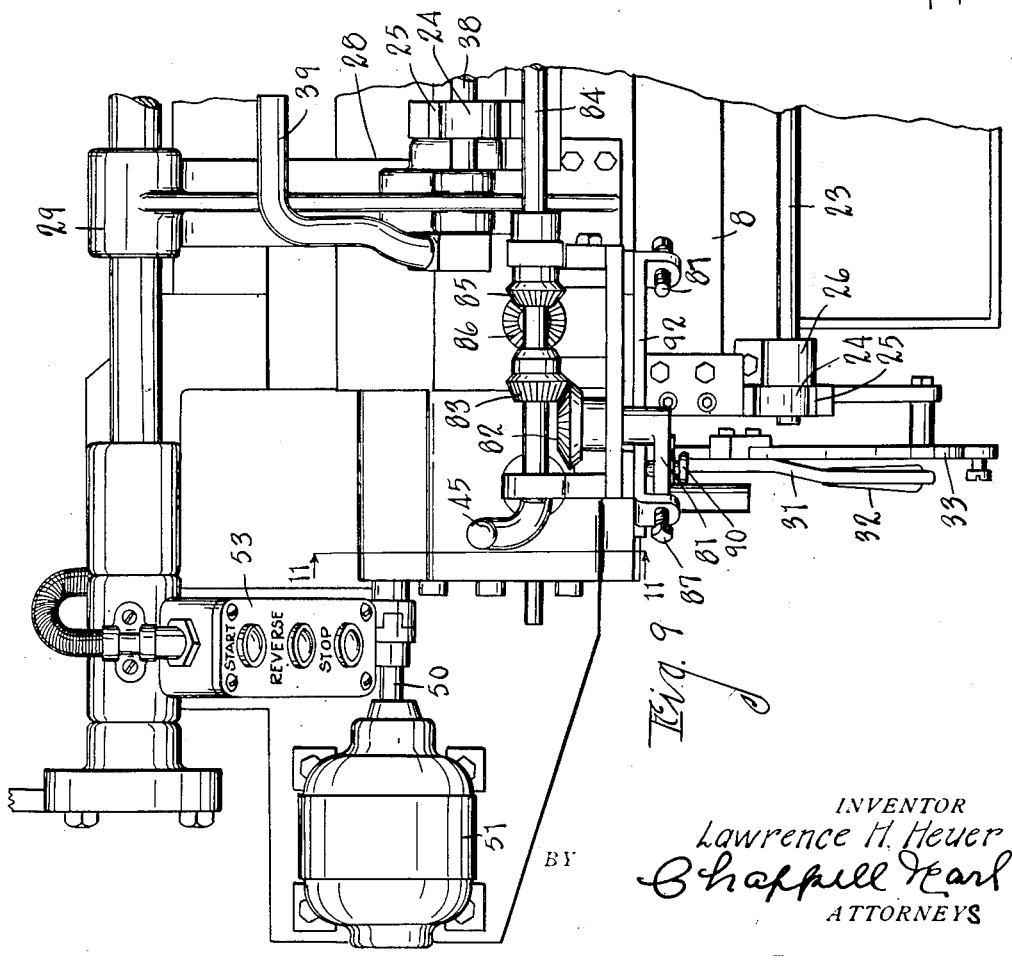
INVENTOR
Lawrence H. Heuer
BY Chappell Earl
ATTORNEYS Oct. 17, 1933.  L. H. HEUER  1,930,715
SPRING ASSEMBLING MACHINE
Filed Feb. 3, 1933  9 Sheets-Sheet 6

INVENTOR
Lawrence H. Heuer
BY
Chappell & Earl
ATTORNEYS

Oct. 17, 1933.   L. H. HEUER   1,930,715
SPRING ASSEMBLING MACHINE
Filed Feb. 3, 1933   9 Sheets-Sheet 7

INVENTOR
Lawrence H. Heuer
BY
Chappell & Earl
ATTORNEYS

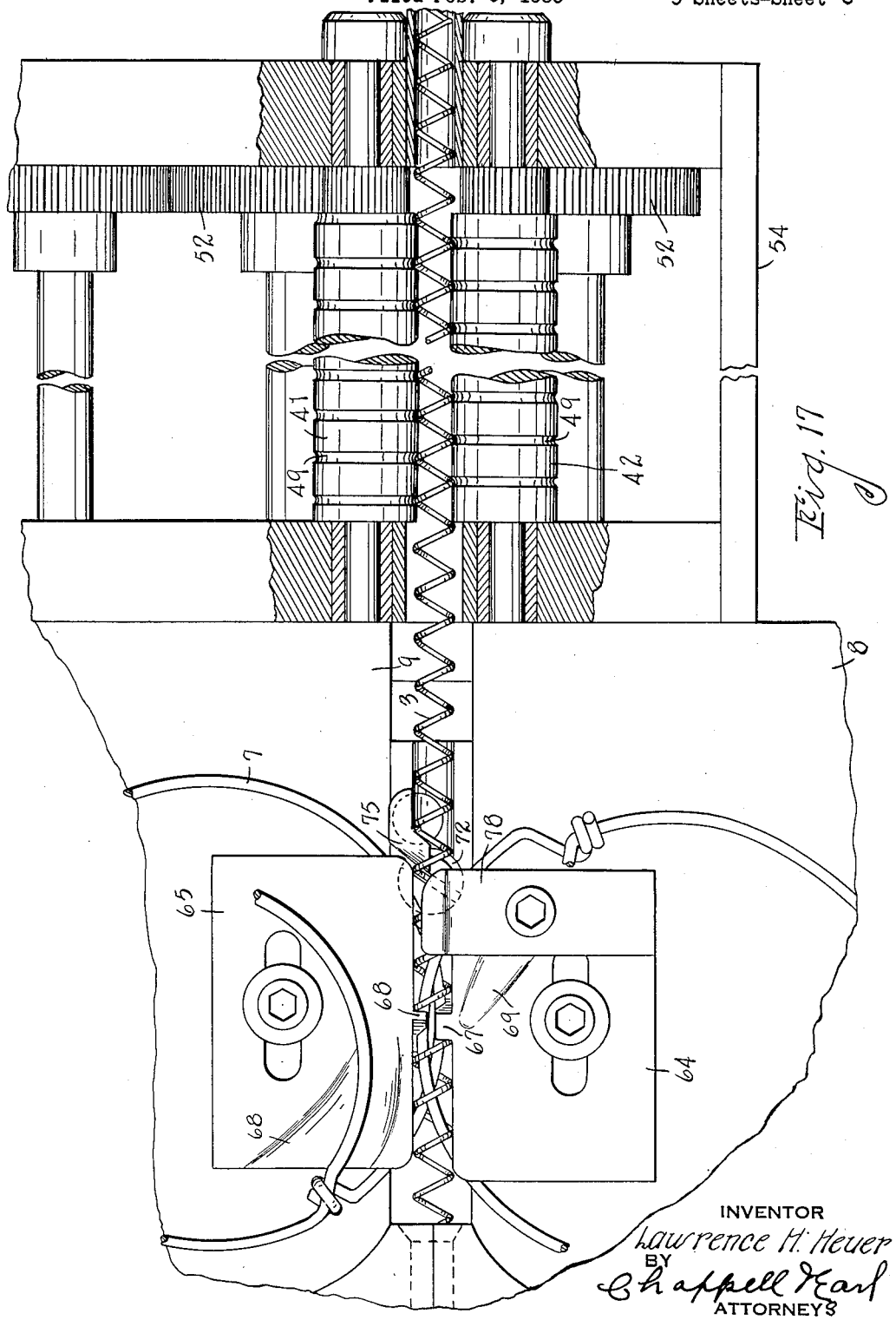

Oct. 17, 1933.  L. H. HEUER  1,930,715
SPRING ASSEMBLING MACHINE
Filed Feb. 3, 1933  9 Sheets-Sheet 9
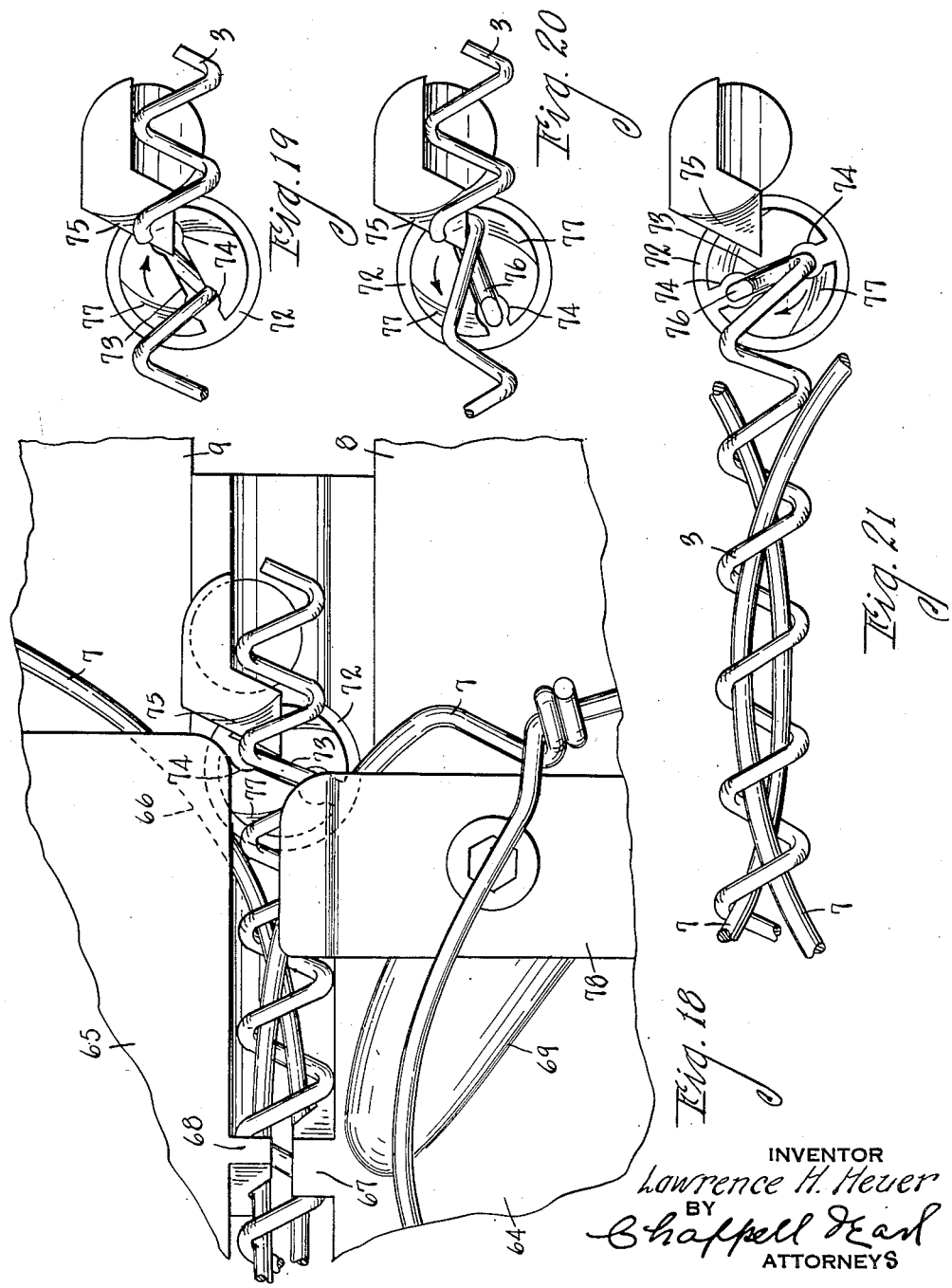
INVENTOR
Lawrence H. Heuer
BY
Chappell Dean
ATTORNEYS Patented Oct. 17, 1933

1,930,715

UNITED STATES PATENT OFFICE.

1,930,715

SPRING ASSEMBLING MACHINE

Lawrence H. Heuer, Detroit, Mich., assignor to L. A. Young Spring & Wire Corporation, Detroit, Mich.

Application February 3, 1933. Serial No. 654,984

55 Claims. (Cl. 140—3)

The main objects of this invention are:

First, to provide a machine for assembling spring units adapted for mattress fillers, cushions, pillows and the like, which is easily operated and of very large capacity.

Second, to provide a machine of this character which may be operated efficiently by relatively unskilled workmen.

Third, to provide a spring assembling machine with automatic means for tying or securing the helical tie members.

Fourth, to provide a spring assembling machine in which there is a minimum of damaged goods or stock.

Objects pertaining to details and economies of my invention will definitely appear from the description to follow. The invention is defined in the claims.

A structure which embodies the features of my invention is illustrated in the accompanying drawings, in which:

Fig. 3 is an end elevation with the machine in open position or positioned to receive the work, the work receiving table being omitted.

Fig. 4 is a fragmentary plan view of the bed of the machine with the work holding chucks in closed position, fragments of the springs being shown in position in one coacting pair of chucks.

Fig. 5 is a fragmentary section on line 5—5 of Fig. 6 showing the chucks or work holding jaws in open position.

Fig. 6 is a fragmentary section on line 6—6 of Figs. 4 and 5 with the work chucks in closed position.

Fig. 7 is an enlarged detail section on line 7—7 of Figs. 4 and 5 with the work in position but prior to the closing of the jaws or chucks.

Fig. 8 is a fragmentary plan view showing details of the cut-off and knotting or tying mechanism.

Fig. 9 is an enlarged fragmentary plan view showing details of the knotting or tying operating mechanism and also of the jaw opening and closing mechanism.

Fig. 10 is a fragmentary sectional view on a line corresponding to line 10—10 of Fig. 12 showing details of the tie member feed mechanism.

Fig. 11 is a fragmentary section on line 11—11 of Fig. 9 showing further details of this feed mechanism, particularly the drive mechanism, and with the feed rolls in driving position.

Fig. 17 is an enlarged fragmentary view of still another form or embodiment of my invention as adapted for assembling springs having undeformed end coils.

Fig. 18 is an enlarged fragmentary view of the structure shown in Fig. 17.

Fig. 19 is an enlarged fragmentary view showing details of the cut-off and tie means of the embodiment shown in Fig. 18.

Fig. 20 is a fragmentary plan view of the parts shown in Fig. 19 in tying or knot forming position.

Fig. 21 is a fragmentary plan view showing the relation of the parts when in work removing position.

The embodiment of my invention illustrated in the accompanying drawings is especially designed for the assembling of mattress filler units and is proportioned accordingly. It comprises a work table 1 provided with work holders or chucks adapted to support the rows of coiled springs 2 in position to receive the helical tie members 3 at the top and bottom thereof.

The embodiment illustrated in Figs 1–13, inclusive, is especially designed, so far as the work holders are concerned, for the supporting of springs having double offsets 4 in their end coils, these being arranged in the completed structure in alternating relation.

Figure 15:
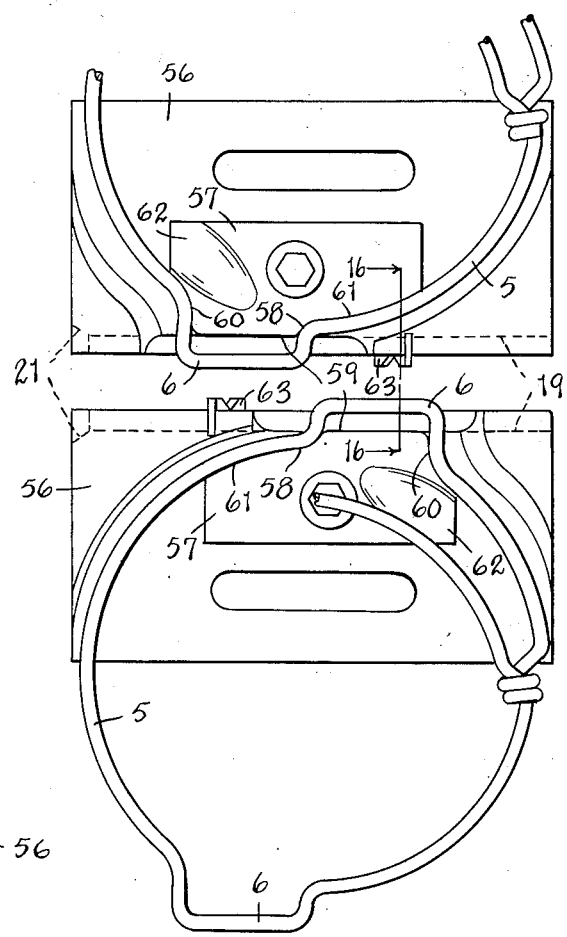
Fig. 15 is an enlarged fragmentary plan view of a modified form of work chuck or holding jaws with the jaws open.
Figure 16:
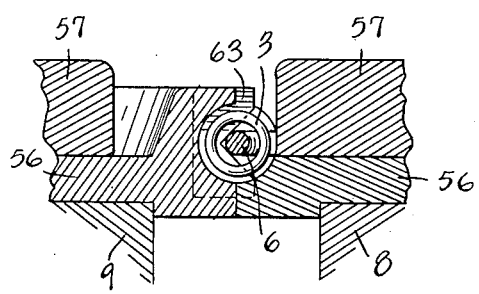
Fig. 16 is an enlarged detail section on line 16—16 of Fig. 15 with the jaws closed.

In the modification shown in Figs. 15 and 16 the jaws or work chucks are designed to support springs 5 having offset 6 in their end coils disposed with the reaches thereof in alined relation.

In the embodiment shown in Figs. 17 and 18 the jaws or work chucks are adapted for the supporting of springs 7 in which the end coils are not deformed or have no offsets.

The spring supports comprise a pair of bed plates 8 and 9, the bed plate 8 being slidably mounted on ways 10 for movement to and from the bed plate 9. These bed plates carry coacting pairs of jaws or work chucks 11 having longitudinal slots 12 therein to receive the clamping bolts 13 so that the jaws or chuck members may be adjusted longitudinally relative to each other and to properly position for the spacing of the springs in the assembled unit. These jaws have seats 14 for the end coils and positioning blocks 15 recessed at 16 to receive the inwardly projecting portions 17 between the offsets 4 of the end coils.

In chucking the springs they are engaged over the positioning blocks and forced outwardly thereon, forcing the offsets 17 into these recesses and into engagement with the clamping springs 18, see Fig. 7. In this position the springs are effectively held so that when the bed plate 8 is closed as shown in Figs. 4 and 6 the springs are brought into relation to receive the helical with the bight portions of their offsets in alinement.

The spring supporting jaws or chucks are provided on their inner edges with facing channeled guides 19 for the helical 3. These guides have portions of their upper walls cut away at 20 to expose the offsets of the spring and the helical as it is engaging therewith so that the operator can watch the end of the helical as it passes through the chucks. The tie member or helical guides preferably have flaring mouths 21 and one of the guide members of each pair is provided with a round tie member positioning member or feed pin 22 disposed in advance of the work. This feed pin engages the coil of the helical as it is advanced by the feed means to be hereafter described and insures the proper presentation of the end of the advanced helical or tie member to engage the work.

In placing the work in the machine the bed member 8 is moved to open position, rows of springs placed in the jaws, and all the jaws simultaneously closed by shifting of the bed member 8 to jaw closing position. This bed member is shifted by the rockshaft 23 having eccentrics 24 thereon coacting with the thrust blocks 25 on the bed member 8, the rockshaft being mounted on the frame in bearings 26. The rockshaft is provided with an actuating lever 27.

Figure 1:
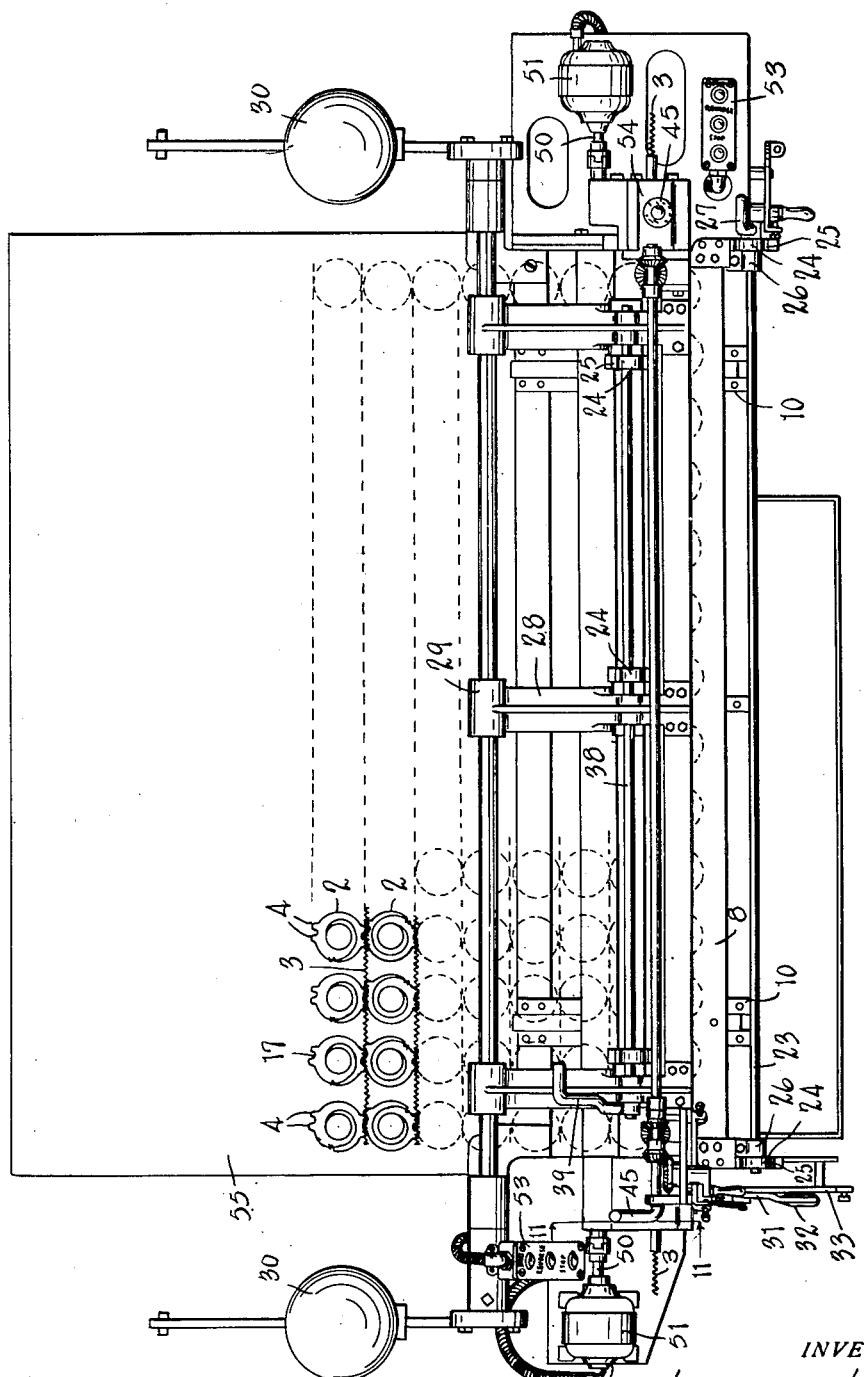
Fig. 1 is a plan view of an assembling machine embodying the features of my invention, the spring parts assembled being illustrated mainly in conventional form.
Figure 2:
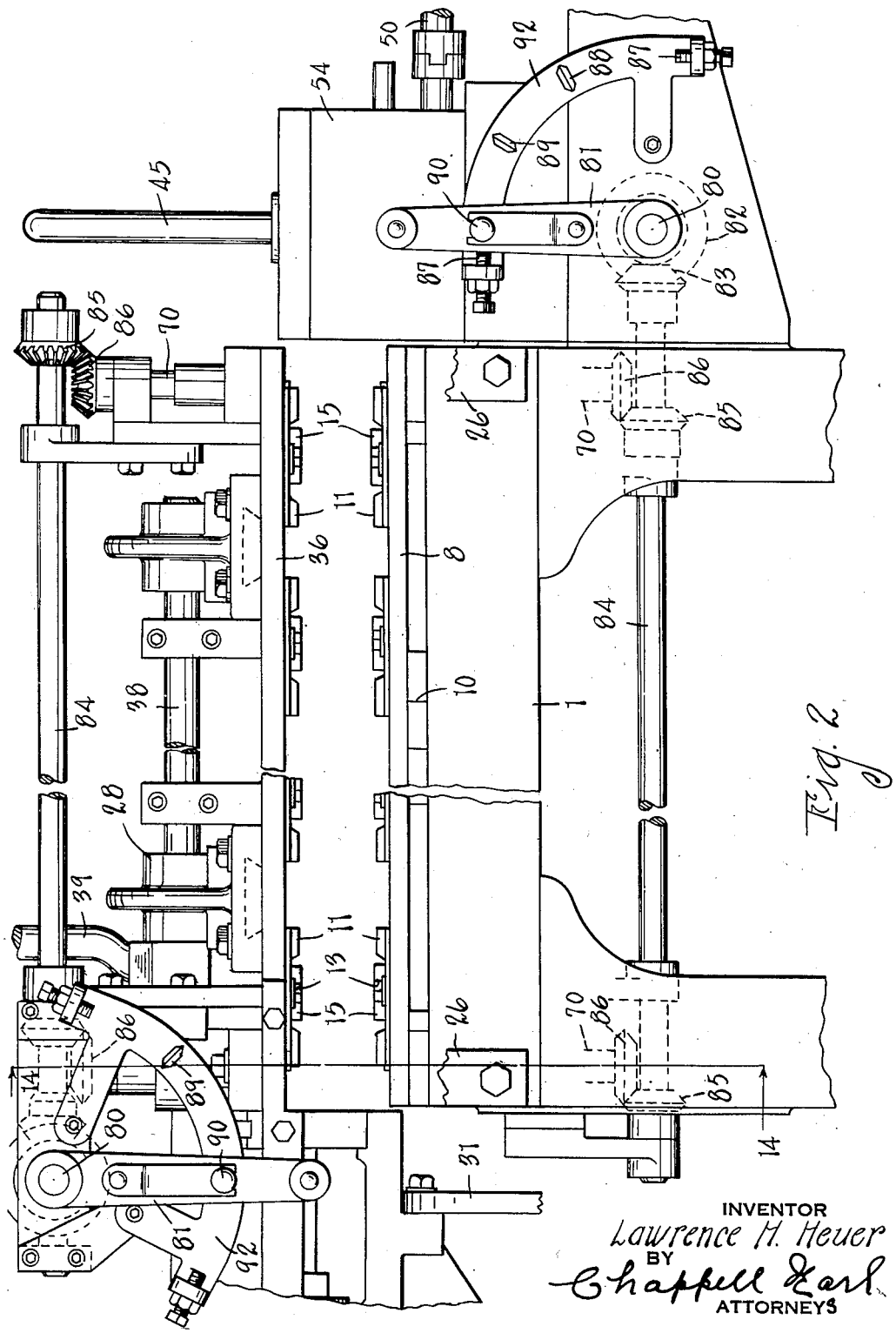
Fig. 2 is a fragmentary front elevation.

To properly support the upper ends of the springs I provide an upper holder consisting of the swinging head 28 which is pivotally mounted at 29 and preferably provided with a counterbalance weight 30. This head is controlled by the lever 31 having a detent 32 coacting with a keeper segment 33 and adapted to hold the head in open position as shown in Fig. 3 to facilitate the arrangement of the upper end coils of the springs in the jaws. The segment has keepers 34 and 35 to receive the detent for holding the head in its spring holding position as shown in Figs. 1 and 2. The upper head is provided with coacting pairs of jaws 11 mounted on fixed and movable jaw plates 36 and 37, the movable jaw plate being controlled by a rockshaft 38 having a handle 39. As the details of these jaws are the same as the lower jaws described, further description is unnecessary.

Figure 12:
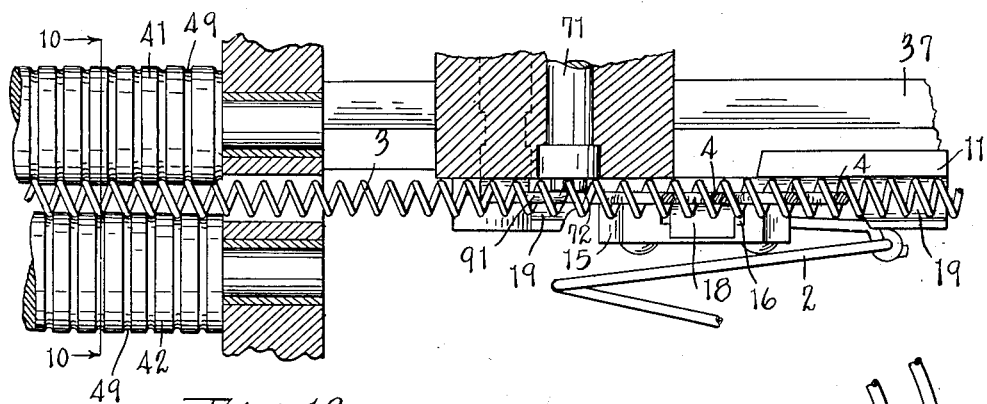
Fig. 12 is a fragmentary section on a line corresponding to the broken line 12—12 of Fig. 10 showing details of the feed means and the relation thereof to the spring supporting jaws.
Figure 13:
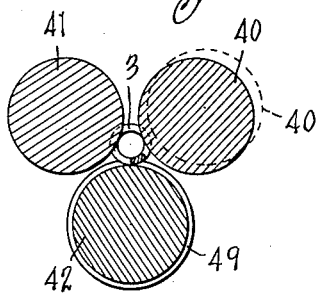
Fig. 13 is an enlarged detail section through the feed rollers, the open position of the movable feed roller being indicated by dotted lines.

The feed means preferably comprises grooved feed rollers 40, 41 and 42, the feed roller 40 being mounted for lateral adjustment to and from the feed rollers 41 and 42 so that it may be retracted to permit the introduction of the previously formed helical 3 and also to start and stop the feed. The shaft 43 of the feed roller 40 is mounted in bearings carried by the slides 44, these slides being controlled by the hand lever 45 on the rockshaft 46 carrying forked arms 47 engaging cross rod 48 on the slides. The rollers are preferably annularly grooved at 49, and the grooves of the several rollers preferably disposed in stepped relation as indicated in Fig. 12 to properly receive the spirals. This performs a double function, that of insuring uniform feed and also preventing the collapsing of the helical by excessive pressure on the controlling feed roller.

The feed rollers are all driven feed rollers, being connected to the shaft 50 of the reversible motor 51 by a suitable train of gears designated generally by the numeral 52 in Fig. 11. This train of gears is designed to drive the rollers at proper speed and also in proper direction relative to each other. The reversible motor is controlled by a switchboard unit 53 having start, reverse and stop push buttons as best shown in Fig. 9. The feed unit described, which is designated as a whole by the numeral 54 is duplicated for the top unit, the top feed unit being mounted on the head member.

With this feed means the operator not only has the control of the start, stop and reverse means for the motor but the feed of the helical is under the direct control of the operator through the manipulation of the lever 45. In other words, the feed may be stopped and started through manipulation of the lever 45 and may be slowed up or step by step feeding imparted merely by the manipulation of this lever. Therefore, the feed is under complete control at all times, and in the event of the helical jamming or not properly engaging each spring the feed can be quickly stopped and the motor reversed to withdraw or retract the helical.

The machine is preferably operated by two workmen, one manipulating the feed for the lower helical or tie member and the other the upper helical feed means. The work can be quickly chucked and is quickly released. As the assembling proceeds the work is fed out on to a receiving table 55.

In the modification shown in Figs. 15 and 16 the chucking jaws 56 have jaw blocks 57 with faces 58 especially designed to receive and support the springs 5 having single offsets 6 in their end coils. The faces 58 of these jaws have portions 59 adapted to enter the offsets and portions 60 and 61 adapted to engage the spring at each side of the offset. The tops of these jaw blocks are cut away at 62 to accommodate the coil adjacent the end coil, that is, these recesses 62 permit the end coils to be engaged with the jaws without placing stress upon the adjacent coils.

The jaws 56 have guide channels in their opposed edges as described for the jaws 11. They are also provided with V shaped clamps 63 positioned to engage the bights of the offsets 6 and disposed in an inclined relation relative to the axis of the helical guide, so as not to distort the coil of the helical and serve in effect to insure the advancement and positioning of the helical as it is rotated.

In the modification shown in Figs. 17 and 18 the jaws 64 and 65 are especially designed to receive the undeformed springs 7. These jaws 64 and 65 have notches 66 in their inner corners adapted to receive the bottom coils of the springs, and they have centrally disposed V shaped clamp members 67 and 68 disposed adjacent but in oppositely inclined relation. The clamp member 67 is inclined toward the feed and the clamp member 68 is inclined away from it, this in order to accommodate the spirals of the helical tie member as shown in Figs. 17 and 18.

When the jaws or chuck members 64 and 65 are closed upon the springs the bottom coils are brought to overlapping relation as illustrated and the overlapped parts are placed under clamping stress temporarily distorting the springs, that is, the overlapped parts are collapsed or compressed toward each other so that the helical may be readily engaged therewith, and when the springs are removed from the chucks they expand into binding engagement with the coils embracing the overlapped parts as shown in Fig. 1. This has the double advantage of enabling the use of a coil of minimum diameter and also a more effective clamping or securing of the parts engaged by the helical. This collapsing may be said to temporarily expand or enlarge the curvature of the segments of the coils engaged by the jaws.

The jaws 64 and 65 have recesses 68 and 69 in the upper sides thereof corresponding to the recesses 62 for the jaws 56.

Figure 14:
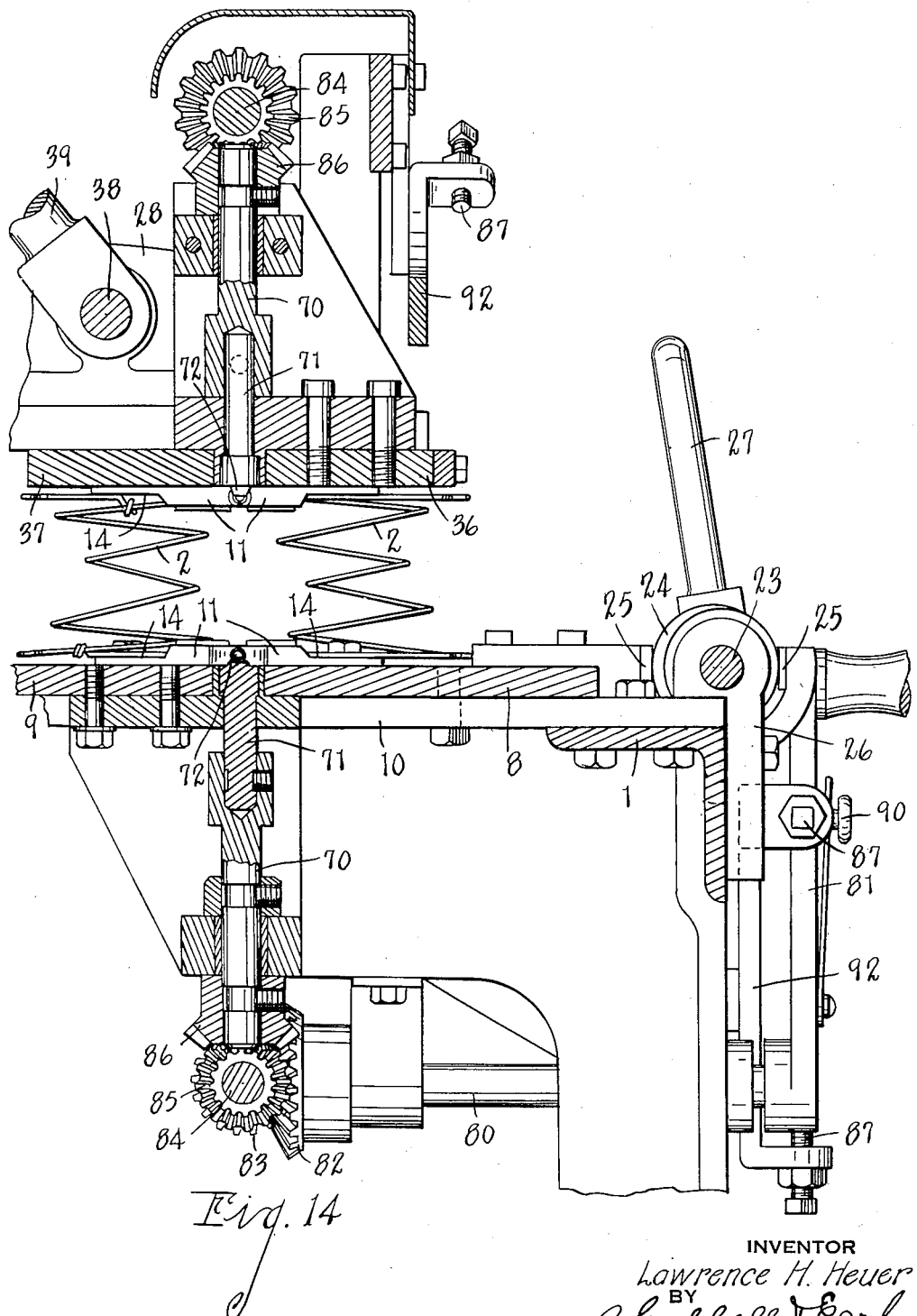
Fig. 14 is an enlarged detail mainly in vertical section on a line corresponding to line 14—14 of Fig. 2 showing further details of the cut-off and knotting mechanism.

To trim or cut off the ends of the helical tie member and to knot or turn the end inwardly so that it does not present a tearing or objectionable projection, I provide means at each end of the bed plate adapted to simultaneously cut off or deflect and bend inwardly the ends of the helical tie member. This mechanism is most clearly illustrated in Figs. 18, 19 and 20 and its actuating means in Fig. 14. The parts are slightly modified when adapted for the smaller helical as shown in detail in Fig. 8 and as will be later pointed out. The actuating mechanism, however, is the same in both forms. A description of the mechanism at one end and the operating connections will suffice. It is to be understood that the same mechanism is duplicated on the swinging head, being there arranged in an inverted position as considered in connection with the mechanism mounted on the bed.

This cutting and bending mechanism comprises a shaft 70 having a spindle 71 mounted in the end thereof and terminating in the oscillating head 72 having a transverse groove 73 in the face thereof with enlargements 74 adjacent the ends of the grooves. These enlargements are designed to facilitate the entrance and exit of the helical to and from the groove. The groove is preferably undercut so that during the cutting off operation and the bending operation the portions of the helical lying within the groove are locked and effectively retained therein. The head acts as a shear member, forcing the wire against the cutter 75 when the head is rotated in the direction indicated by the arrow in Fig. 9, thereby severing the end of the helical tie member at a predetermined point. When the head is rotated in the opposite direction as indicated by the arrow in Fig. 20, the end 76 of the tie member engaged in the slot is twisted to the position shown in Fig. 20. Before the work is released, however, the head is returned to position shown in Fig. 21. The movement to the position shown in Fig 20 imparts the proper set to the inbent end so that it does not normally spring outwardly beyond the position shown in Fig. 21 when released from the former.

When the former head is in its initial position shown in Fig. 18 the groove is presented in proper position to correspond to the pitch of the spiral so that the spiral readily enters the groove and is distorted thereby, the head serving in effect as a feed member; that is, the rotation of the spiral engaged within the groove serves to assist in advancing the spiral. The head is beveled off at 77 on its opposite edges to further accommodate the turns of the helical.

To insure that the helical is retained within the groove of the former a retaining clip 78 is mounted on one of the jaw or chuck members of the end pair, see Fig. 17, this overhanging a portion of the former head. As stated, these parts are duplicated at each end of the bed and they are simultaneously actuated from the crank shaft 80 having a crank 81 at its outer end and a beveled gear 82 meshing with a beveled gear 83 on the shaft 84 disposed longitudinally of the machine. This shaft has beveled gears 85 thereon meshing with beveled gears 86 on the outer ends of the shaft 70. As stated, this mechanism is duplicated for the swinging head but it is arranged in reversed relation.

The lever or crank 81 is provided with a segment 92 having adjustable end stops 87 in the form of screws and intermediate stops 88 and 89 coacting with a spring pressed detent 90. With the lever or crank in the position shown at the right hand of Fig. 2 the former head is in its extreme return position shown in Fig. 20. In its normal position, as shown in Fig. 18, the lever should be in engagement with the stop 88 which is the feeding position. With the lever in this feeding position, when the feeding of the helical is stopped, the lever is first swung against the lower stop 87 which trims off the end of the helical. It is then swung to the extreme position as shown in Fig. 2, then swung to the right until the detent 90 engages the keeper 89, which is the position shown in Fig. 21 and in which position the work is removed. Before the feeding of a succeeding helical begins, the lever should be moved so that its detent engages the stop 88.

In the modification shown in Fig. 8 the cutter 91 corresponding to the cutter 75 is modified in shape to render the same effective for helicals of small diameter, the blade portion of the cutter being disposed longitudinally of the path of the helicals and so that the spirals of the helical can pass around the same as the helical is advanced. Otherwise the parts are substantially the same as those described.

This application is in some respects an improvement upon and adaptation of the mechanism shown in my application for Letters Patent for Spring assembling machines, filed January 2, 1932, Serial No. 584,330, and particularly so far as the feed mechanism for the helical tie members is concerned is a continuation in part of that application.

This combination and arrangement of parts enables the very rapid manipulation of the work, both in the matter of chucking the springs in position to receive the helicals and also in feeding of the helicals which are, as stated, under complete control of the operator and may be advanced or retracted through the manipulation of the reversing motor and the feed control lever. The helical tie members may be advanced to any extent merely by manipulation of the feed control levers.

I have illustrated and described my invention in embodiments which have proved highly successful commercially. I have not attempted to illustrated various modifications and adaptations which I contemplate and which might be desirable for the assembling of spring structures having peculiar features, or for springs which it is desired to connect in a particular manner, as it is believed that this disclosure will enable those skilled in the art to embody or adapt my improvements as may be desired.

Having thus described my invention what I claim as new and desire to secure by Letters Patent is:

1. In a machine of the class described, the combination of bed plates, one adjustable to and from the other, chucking jaw plates mounted on said bed plates in opposed relation for longitudinal adjustment on the bed plates and having seats on their faces for springs to be connected and opposed longitudinal tie member guide channels on their inner edges coacting to provide tie member guides, chucking jaws arranged on said jaw plates in opposed offset relation and having work positioning shoulders at their inner corners and central forwardly opening recesses receiving portions of springs between spaced offsets thereof, work engaging blade springs disposed in said recesses to engage the portions of the work disposed therein, and feed means for rotating the advancing helical tie members through said guides.

2. In a machine of the class described, the combination of bed plates, one adjustable to and from the other, chucking jaw plates mounted on said bed plates in opposed relation and having seats on their faces for springs to be connected and opposed longitudinal tie member guide channels on their inner edges coacting to provide tie member guides, chucking jaws arranged on said jaw plates in opposed relation and having work positioning shoulders at their inner corners and central forwardly opening recesses receiving portions of springs between spaced offsets thereof, work engaging blade springs disposed in said recesses to engage the portions of the work disposed therein, and feed means for rotating and advancing helical tie members through said guides.

3. In a machine of the class described, the combination of bed plates, one adjustable to and from the other, chucking jaw plates mounted on said bed plates in opposed relation and having seats on their faces for springs to be connected and opposed longitudinal tie member guide channels on their inner edges coacting to provide tie member guides and beveled at their forward ends to provide flaring mouths for the guides, central portions of the upper walls of the channels being cut away to expose the work, chucking jaws arranged on said jaw plates in opposed relation and having work positioning shoulders at their inner corners and central forwardly opening recesses receiving portions of springs between spaced offsets thereof, work engaging blade springs disposed in said recesses to engage the portions of the work disposed therein, round tie member positioning pins having rounded ends projecting into the channel of one jaw plate of each pair and in advance of the jaws of the pair, and feed means for rotating the advancing helical tie members through said guides.

4. In a machine of the class described, the combination of chucking jaw plates mounted in opposed relation for longitudinal adjustment and having seats on their faces for springs to be connected and opposed longitudinal tie member guide channels on their inner edges coacting to provide tie member guides, chucking jaws on said jaw plates having recesses receiving portions of springs engaged therewith, work engaging springs on said jaws, and tie positioning members projecting into the channel of one jaw plate of each pair and in advance of the jaws of the pair.

5. In a machine of the class described, the combination of chucking jaw plates mounted in opposed relation and having seats on their faces for springs to be connected and opposed longitudinal tie member guide channels on their inner edges coacting to provide tie member guides, chucking jaws on said jaw plates having recesses receiving portions of springs engaged therewith, and work engaging springs on said jaws.

6. In a machine of the class described, the combination of chucking jaw plates mounted in opposed relation and having seats on their faces for springs to be connected and opposed longitudinal tie member guide channels on their inner edges coacting to provide tie member guides and beveled at their forward ends to provide flaring mouths for the guides, central portions of the upper walls of the channels being cut away to expose the work, chucking jaws on said jaw plates having recesses receiving portions of springs engaged therewith, work engaging springs on said jaws, and tie positioning members projecting into the channel of one jaw plate of each pair and in advance of the jaws of the pair.

7. In a machine of the class described, the combination of chucking jaw plates mounted in opposed relation and having seats on their faces for springs to be connected and opposed longitudinal tie member guide channels on their inner edges coacting to provide tie member guideses and beveled at their forward ends to provide flaring mouths for the guides, central portions of the upper walls of the channels being cut away to expose the work, chucking jaws on said jaw plates having recesses receiving portions of springs engaged therewith, and work engaging springs on said jaws.

8. In a machine of the class described, the combination of chucking jaw plates mounted in opposed relation for longitudinal adjustment and having seats on their faces for springs to be connected, chucking jaws arranged on said jaw plates in opposed offset relation and having forwardly opening recesses receiving portions of springs between spaced offsets thereof, and work engaging springs disposed in said recesses to engage the portions of the work disposed therein.

9. In a machine of the class described, the combination of chucking jaw plates mounted in opposed relation and having seats on their faces for springs to be connected, chucking jaws arranged on said jaw plates in opposed relation and having forwardly opening recesses receiving portions of springs between spaced offsets thereof, and work engaging springs disposed in said recesses to engage the portions of the work disposed therein.

10. In a machine of the class described, the combination of bed plates, one adjustable to and from the other, chucking jaw plates mounted on said bed plates in coacting pairs, spring chucking jaws associated with said jaw plates, opposed coacting tie member guide channels associated with said jaw plates and extending to both sides of said jaws, portions of the upper walls of the channels adjacent the jaws being cut away to expose the work so that the ends of the tie members can be seen as they pass through the chucking jaws, tie member positioning members or feed pins projecting into the guides in advance of the work, and means for advancing and rotating helical tie members through the guides.

11. In a machine of the class described, the combination of bed plates, one adjustable to and from the other, chucking jaw plates adjustably mounted on said bed plates in coacting pairs, spring chucking jaws associated with said jaw plates, opposed coacting tie member guide channels associated with said jaw plates, tie member positioning members or feed pins projecting into the guides in advance of the work, and means for advancing and rotating helical tie members through the guides.

12. In a machine of the class described, the combination of bed plates, one adjustable to and from the other, chucking jaw plates mounted on said bed plates in coacting pairs and for longitudinal adjustment on the bed plates, spring chucking jaws associated with said jaw plates, opposed coacting tie member guide channels associated with said jaw plates, tie member positioning members or feed pins projecting into the guides in advance of the work, and means for advancing and rotating helical tie members through the guides.

13. In a machine of the class described, the combination of bed plates, one adjustable to and from the other, chucking jaw plates mounted on said bed plates in coacting pairs, spring chucking jaws associated with said jaw plates, opposed coacting tie member guide channels associated with said jaw plates and extending to both sides of said jaws, portions of the upper walls of the channels adjacent the jaws being cut away to expose the work so that the ends of the tie members can be seen as they pass through the chucking jaws, and means for advancing and rotating helical tie members through the guides.

14. In a machine of the class described, the combination of chucking jaw plates disposed in opposed relation and constituting seats for springs to be connected and having opposed channels providing tie member guides, chucking jaws on said jaw plates adapted to support springs having offsets therein with the bights of their offsets in alined relation, springs on said jaws engaging the work adjacent the point of the tie member's engagement therewith, round tie member positioning members projecting into the tie member guides in advance of the jaws, and means for rotating and advancing helical tie members through the guides.

15. In a machine of the class described, the combination of chucking jaw plates disposed in opposed relation and constituting seats for springs to be connected and having opposed channels providing tie member guides, chucking jaws on said jaw plates, round tie member positioning members or feed pins projecting into the tie member guides in advance of the work, and means for rotating and advancing helical tie members through the guides.

16. In a machine of the class described, the combination of chucking jaw plates disposed in opposed relation and constituting seats for springs to be connected and having opposed channels providing tie member guides, chucking jaws on said jaw plates adapted to support springs having offsets therein with the bights of their offsets in alined relation, springs on said jaws engaging the work adjacent the point of the tie member's engagement therewith, and means for rotating and advancing helical tie members through the guides.

17. A machine of the class described, comprising a coacting pair of chucking jaw plates, one of which is adjustable to and from the other, said jaw plates having opposed longitudinal tie member guide channels on their inner edges coacting to provide a tie member guide, said jaw plates having seats on their upper faces for the springs to be chucked and being provided with chucking jaws for springs having offsets in their end coils and adapted to support the bights of such offsets in alined relation centrally within the guide, each of said jaw plates being provided with a notched clamp member engaging the offset of the spring mounted on the opposite jaw plate and disposed in oppositely inclined relation and at angles substantially corresponding to the pitch of the helical tie member, and feed means for rotating and advancing a helical tie member through said guide.

18. A machine of the class described, comprising a coacting pair of chucking jaw plates, one of which is adjustable to and from the other, said jaw plates having opposed longitudinal tie member guide channels on their inner edges coacting to provide a tie member guide, said jaw plates having seats on their upper faces for the springs to be chucked and being provided with chucking jaws for springs having offsets in their end coils and adapted to support the bights of such offsets in alined relation centrally within the guide, each of said jaw plates being provided with a notched clamp member engaging the offset of the spring mounted on the opposite jaw plate, and feed means for rotating and advancing a helical tie member through said guide.

19. A machine of the class described comprising a coacting pair of chucking jaw plates, one of which is adjustable to and from the other, said jaw plates having opposed longitudinal tie member guide channels on their inner edges coacting to provide a tie member guide, said jaw plates having chucking jaws supporting pairs of springs with parts thereof within the guide, each of said jaw plates being provided with a notched clamp member engaging the offset of the spring mounted on the opposite jaw plate and disposed in oppositely inclined relation and at angles substantially corresponding to the pitch of the helical tie member, and feed means for rotating and advancing a helical tie member through said guide.

20. A machine of the class described comprising a coacting pair of chucking jaw plates, one of which is adjustable to and from the other, said jaw plates having opposed longitudinal tie member guide channels on their inner edges coacting to provide a tie member guide, said jaw plates having chucking jaws supporting pairs of springs with parts thereof within the guide, each of said jaw plates being provided with a notched clamp member engaging the offset of the spring mounted on the opposite jaw plate, and feed means for rotating and advancing a helical tie member through said guide.

21. A machine of the class described comprising a coacting pair of chucking jaw plates having opposed longitudinal tie member guide channels on their inner edges coacting to provide a tie member guide, central portions of the upper walls of the channels being cut away to expose the work so that the ends of the tie members can be seen as they pass through the chucking jaws, said jaw plates having seats on their upper faces for the springs to be chucked and being provided with chucking jaws for springs having offsets in their end coils and adapted to support the bights of such offsets in alined relation centrally within the guide.

22. A machine of the class described comprising a coacting pair of chucking jaw plates having opposed longitudinal tie member guide channels on their inner edges coacting to provide a tie member guide, central portions of the upper walls of the channels being cut away to expose the work so that the ends of the tie members can be seen as they pass through the chucking jaws, said jaw plates having chucking jaws for springs supporting portions thereof within the guide.

23. In a machine of the class described, the combination of bed plates, one of which is adjustable to and from the other, chucking jaws carried by said bed plates and arranged in opposed coacting pairs and having spring engaging seats at the inner corners thereof and notched coil engaging clamp members disposed in opposed oppositely inclined relation between said seats and constituting positioning guides for helical tie members, and means for rotating and advancing the helical tie members between said jaws and into engagement with portions of the chucked springs.

24. In a machine of the class described, the combination of bed plates, one of which is adjustable to and from the other, coacting pairs of chucking jaws carried by said bed plates having spaced spring engaging seats and coil engaging clamp members disposed between said seats, the clamp member of one chucking jaw engaging the coil of the spring disposed in the seats of the coacting jaw between the seats and when the bed members are in closed position placing the chucked spring under distorting stress and forcing overlapped parts thereof toward each other, and means for rotating and advancing helical tie members between said jaws whereby the same is threaded around the overlapped parts.

25. In a machine of the class described, the combination of bed plates, one of which is adjustable to and from the other, and chucking jaws carried by said bed plates and arranged in opposed coacting pairs having spaced spring engaging seats and coil engaging clamp members disposed between the seats, the clamp member of one jaw engaging the coil of a chucked spring supported by the opposed jaw intermediate its point of support and placing it under distorting stress when the jaws are closed.

26. In a machine of the class described, the combination of a series of work chucks adapted to support rows of springs to be assembled, each guide having a tie member positioning member disposed in advance of the springs to position the end of the helical relative thereto as the helical is advanced, and means for rotating and advancing the helical tie members through said chucks and into engagement with portions of the chucked springs comprising a reversible motor, coacting feed rollers driven thereby and having peripheral annular grooves therein, the grooves of the rolls being disposed in stepped relation, one of the rolls being adjustable relative to the other, and a manual control means for said adjustable roller whereby it may be adjusted to and from the coacting rollers to facilitate the positioning of the work therein to start and stop and regulate the feed, such feed control means being independent of the starting, stopping and reversing means of said motor.

27. In a machine of the class described, the combination of a series of work chucks adapted to support rows of springs to be assembled, and means for rotating and advancing the helical tie members through said chucks and into engagement with portions of the chucked springs comprising a reversible motor, coacting feed rollers driven thereby, one of the rolls being adjustable relative to the other, and a manual control means for said adjustable roller whereby it may be adjusted to and from the coacting rollers to facilitate the positioning of the work therein to start and stop and regulate the feed, such feed control means being independent of the starting, stopping and reversing means of said motor.

28. In a machine of the class described, the combination of a series of work chucks adapted to support rows of springs to be assembled and having tie member guides extending to each side of the chucks and open to expose for inspection portions of the work to be engaged by the helical tie member, and means for rotating and advancing the helical tie members through said chucks and into engagement with portions of the chucked springs comprising a reversible motor, coacting feed rollers driven thereby, one of the rolls being adjustable relative to the other, and a manual control means for said adjustable roller whereby it may be adjusted to and from the coacting rollers to facilitate the positioning of the work therein to start and stop and regulate the feed, such feed control means being independent of the starting, stopping and reversing means of said motor.

29. In a machine of the class described, the combination of a means for supporting springs to be assembled, and means for rotating and advancing helical tie members into engagement with the springs comprising a reversible motor, coacting feed rollers driven thereby and having annular grooves therein, the grooves of the rolls being disposed in stepped relation, one of the rolls being adjustable relative to the other, and a manual control means for said adjustable roller whereby it may be adjusted to and from the coacting rollers to control the feed, such feed control means being independent of the starting, stopping and reversing means of said motor.

30. In a machine of the class described, the combination of a means for supporting springs to be assembled, and means for rotating and advancing helical tie members into engagement with the springs comprising a reversible motor, coacting feed rollers driven thereby, one of the rolls being adjustable relative to the other, and a manual control means for said adjustable roller whereby it may be adjusted to and from the coacting rollers to control the feed, such feed control means being independent of the starting, stopping and reversing means of said motor.

31. In a machine of the class described, the combination of a means for supporting springs to be assembled, and means for rotating and advancing and guiding helical tie members into engagement with the springs comprising a plurality of coacting feed rollers, having peripheral annular grooves therein, the grooves of the rolls being disposed in stepped relation, one of the rolls being adjustable relative to the other, and a manual control means for said adjustable roller whereby it may be adjusted to and from the coacting rollers to start and stop and regulate the feed.

32. In a machine of the class described, the combination of a means for supporting springs to be assembled, and means for rotating and advancing and guiding helical tie members into engagement with the springs comprising a plurality of coacting feed rollers, one of the rolls being adjustable relative to the other, and a manual control means for said adjustable roller whereby it may be adjusted to and from the coacting rollers to start and stop and regulate the feed.

33. In a machine of the class described the combination of means for supporting springs to be assembled in alinement and means for rotating and advancing helical tie members into engagement with portions of the supported spring comprising reversibly driven feed rollers having annular grooves disposed with the grooves of the rollers in stepped relation to each other, at least one of the rollers being adjustable relative to each other and provided with manual control means whereby it may be adjusted to control the feed.

34. In a machine of the class described, the combination of means for supporting springs to be assembled in alinement and means for rotating and advancing helical tie members into engagement with portions of the supported spring comprising reversibly driven feed rollers, at least one of the rollers being adjustable relative to each other and provided with manual control means whereby it may be adjusted to control the feed.

35. In a machine of the class described, the combination of means for supporting springs to be assembled in alinement and means for rotating and advancing helical tie members into engagement with portions of the supported spring comprising feed rollers having annular grooves disposed with the grooves of the rollers in stepped relation to each other, at least one of the rollers being adjustable relative to each other and provided with manual control means whereby it may be adjusted to and from feeding position to control the feed, and means for reversibly driving at least one of said feed rollers, said reversible driving means being provided with control means independent of said feed roller adjusting means.

36. In a machine of the class described, the combination of means for supporting springs to be assembled in alinement and means for rotating and advancing helical tie members into engagement with portions of the supported spring comprising feed rollers, at least one of the rollers being adjustable relative to each other and provided with manual control means whereby it may be adjusted to and from feeding position to control the feed, and means for reversibly driving at least one of said feed rollers, said reversible driving means being provided with control means independent of said feed roller adjusting means.

37. In a machine for assembling spring units, the combination with means for supporting springs to be assembled in alined relation and guiding a helical tie member thereto, of feed means for advancing and rotating helical tie members, tie member cut-off and bending heads oscillatingly supported in the path of the tie member at the ends of the alined springs and receiving coils of the tie member as it is advanced by the feed means, tie member retainers disposed in opposed relation to said heads, cutters operatively associated with said heads, oscillating shafts for said heads disposed substantially at right angles to the path of the tie member, a rockshaft geared to said head shafts, and means for operating said rockshaft comprising a manually manipulated lever and a coacting segment provided with stops at the ends thereof limiting the cut-off and bending strokes of the lever, said segment having positioning keepers intermediate said stops and said lever having a detent automatically engaging said keepers facilitating the positioning of the lever in work removing and tie member feeding positions.

38. In a machine for assembling spring units, the combination with means for supporting springs to be assembled in alined relation and guiding a helical tie member thereto, of feed means for advancing and rotating helical tie members, tie member cut-off and bending heads oscillatingly supported in the path of the tie member at the ends of the alined springs and receiving coils of the tie member as it is advanced by the feed means, cutters operatively associated with said heads, oscillating shafts for said heads disposed substantially at right angles to the path of the tie member, a rockshaft geared to said head shafts, and means for operating said rockshaft comprising a manually manipulated lever and a coacting segment provided with stops at the ends thereof limiting the cut-off and bending strokes of the lever, said segment having positioning keepers intermediate said stops and said lever having a detent automatically engaging said keepers facilitating the positioning of the lever in work removing and tie member feeding positions.

39. In a machine for assembling spring units, the combination with means for supporting springs to be assembled in alined relation and guiding a helical tie member thereto, of feed means for advancing and rotating helical tie members, tie member cut-off and bending heads oscillatingly supported in the path of the tie member at the ends of the alined springs and receiving coils of the tie member as it is advanced by the feed means, tie member retainers disposed in opposed relation to said heads, cutters operatively associated with said heads, oscillating shafts for said heads disposed substantially at right angles to the path of the tie member, a rockshaft geared to said head shafts, and means for operating said rockshaft comprising a manually manipulated lever.

40. In a machine for assembling spring units, the combination with means for supporting springs to be assembled in alined relation and guiding a helical tie member thereto, of feed means for advancing and rotating helical tie members, tie member cut-off and bending means oscillatingly supported in the path of the tie member at the ends of the alined springs and receiving coils of the tie member as it is advanced by the feed means, cutters operatively associated with said heads, oscillating shafts for said heads disposed substantially at right angles to the path of the tie member, a rockshaft geared to said head shafts, and means for operating said rockshaft comprising a manually manipulated lever.

41. In a machine for assembling spring units, the combination with means for supporting springs to be assembled in alined relation and guiding a helical tie member thereto, of feed means for advancing and rotating helical tie members, tie member cut-off and bending means oscillatingly supported in the path of the tie member at the ends of the alined springs and having transverse undercut grooves receiving coils of the tie member as it is advanced by the feed means, cutters operatively associated with said heads, tie member retaining members disposed in opposed relation to said heads, means for simultaneously actuating said heads comprising a manually manipulated lever and a coacting segment provided with stops at the ends thereof limiting the cut-off and bending strokes of the lever, said segment having positioning keepers intermediate said stops and said lever having a detent automatically engaging said keepers facilitating the positioning of the lever in work removing and tie member feeding positions.

42. In a machine for assembling spring units, the combination with means for supporting springs to be assembled in alined relation and guiding a helical tie member thereto, of feed means for advancing and rotating helical tie members, tie member cut-off and bending heads oscillatingly supported in the path of the tie member at the ends of the alined springs and receiving coils of the tie member as it is advanced by the feed means, cutters operatively associated with said heads, and means for simultaneously actuating said heads comprising a manually manipulated lever and a coacting segment provided with stops at the ends thereof limiting the cut-off and bending strokes of the lever, said segment having positioning keepers intermediate said stops and said lever having a detent automatically engaging said keepers facilitating the positioning of the lever in work removing and tie member feeding positions.

43. In a machine for assembling spring units, the combination with means for supporting springs to be assembled in alined relation and guiding a helical tie member thereto, of feed means for advancing and rotating helical tie members, tie member cut-off and bending heads oscillatingly supported in the path of the tie member at the ends of the alined springs and having transverse undercut grooves receiving coils of the tie member as it is advanced by the feed means, cutters operatively associated with said heads, tie member retaining means disposed in opposed relation to said heads, and means for simultaneously actuating said heads.

44. In a machine for assembling spring units, the combination with means for supporting springs to be assembled in alined relation and guiding a helical tie member thereto, of feed means for advancing and rotating helical tie members, tie member cut-off and bending heads oscillatingly supported in the path of the tie member at the ends of the alined springs and receiving coils of the tie member as it is advanced by the feed means, cutters operatively associated with said heads, and means for simultaneously actuating said heads.

45. In a machine for assembling spring units, the combination with means for supporting springs to be assembled and guiding a helical tie member thereto, of a tie member cut-off and bending head oscillatingly supported in the path of the tie member and having transverse undercut grooves with circuluar enlargements at the ends thereof receiving coils of the tie member as it is advanced, a cutter operatively associated with said head, and means for actuating said head comprising a manually manipulated lever, and a coacting segment provided with stops at the ends thereof limiting the cut-off and bending strokes of the lever, said segment having positioning keepers intermediate said stops and said lever having a detent automatically engaging said keepers facilitating the positioning of the lever in work removing and tie member feeding positions.

46. In a machine for assembling spring units, the combination with means for supporting springs to be assembled and guiding a helical tie member thereto, of a tie member cut-off and bending head oscillatingly supported in the path of the tie member and receiving coils of the tie member as it is advanced, a cutter operatively associated with said head, and means for actuating said head comprising a manually manipulated lever and a coacting segment provided with stops at the ends thereof limiting the cut-off and bending strokes of the lever, said segment having positioning keepers intermediate said stops and said lever having a detent automatically engaging said keepers facilitating the positioning of the lever in work removing and tie member feeding positions.

47. In a machine for assembling spring units, the combination with means for supporting springs to be assembled and guiding a helical tie member thereto, of a tie member cut-off and bending head oscillatingly supported in the path of the tie member and receiving coils of the tie member as it is advanced, a cutter operatively associated with said head, and means for actuating said head comprising a manually manipulated lever and a coacting segment provided with adjustable stops at the ends thereof limiting the cut-off and bending strokes of the lever, said segment having positioning keepers intermediate said stops and said lever having a detent autcmatically engaging said keepers facilitating the positioning of the lever in work removing and tie member feeding positions.

48. In a machine for assembling spring units, the combination with means for supporting springs to be assembled and guiding a helical tie member thereto, of a tie member cut-off and bending head oscillatingly supported in the path of the tie member and receiving coils of the tie member as it is advanced, a cutter operatively associated with said head, and means for actuating said head comprising a manually manipulated lever and locating means operatively associated therewith for indicating a plurality of positions for the head.

49. In a machine for assembling spring units, the combination with means for supporting springs to be assembled and guiding a helical tie member thereto, of a tie member cut-off and bending head oscillatingly supported in the path of the tie member and receiving coils of the tie member as it is advanced, a cutter operatively associated with said head, and means for actuating said head.

50. In a machine for assembling spring units, the combination with means for supporting springs to be assembled and guiding a helical tie member thereto, of a tie member cut-off and bending head oscillatingly supported in the path of the tie member and having transverse undercut grooves with circular enlargement at the ends thereof receiving coils of the tie member as it is advanced, a cutter operatively associated with said head, and means for actuating said head.

51. In a machine of the class described, the combination of a helical tie member guide of channel cross section, a tie member cut-off and bending means oscillatingly supported in said channel and having a transverse groove receiving coils of a tie member as it is advanced, and a cutter coacting with said head and having a blade portion overhanging the head and positioned relative to the head and guide so that coils of the helical pass around the same as the helical is simultaneously rotated and advanced, and means for advancing and rotating a helical.

52. In a machine of the class described, the combination of a guide for helical tie members, and a tie member cut-off and bending means oscillatingly supported in operative relation to said guide, a transverse groove receiving coils of a tie member as it is advanced and a cutter coacting with said head and having a blade portion overhanging the head and positioned relative to the head and guide so that coils of the helical encircle the same as the helical is simultaneously rotated and advanced.

53. In a machine of the class described, the combination of work supporting means adapted to support springs to be connected, and feed means positioned at opposite ends of the work table for rotating and advancing helical tie members into engagement with the supported springs, each feed means comprising a plurality of feed rollers having peripheral annular grooves therein, the grooves of the rolls being arranged in stepped relation, one of the rolls being adjustable relative to the other to facilitate the positioning of the work therein.

54. In a machine of the class described, the combination of work chucks adapted to support rows of springs to be assembled, and means for rotating and advancing a helical tie member into engagement with portions of the chucked springs, said means comprising a reversible motor and feed rollers, at least one of which is driven by said motor, one of the rollers being manually adjustable relative to the other, whereby the tie member may be rotated and advanced or retracted or stopped at any point in the feeding operation.

55. In a machine of the class described, the combination with spring supporting means of a reversible motor provided with starting and reversing switches, feed rollers, one of which is adjustable to control the feed and at least one of which is driven by said motor, for rotating and advancing a helical tie member, and a manual control means for the adjustable roller whereby it may be adjusted to and from a coacting roller while the motor is running in either direction to start and stop the feed.

LAWRENCE H. HEUER.